Sept. 29, 1964    D. J. E. WOLF    3,150,479
POWER LAWN MOWER

Filed Nov. 30, 1962    3 Sheets-Sheet 1

DIETER WOLF

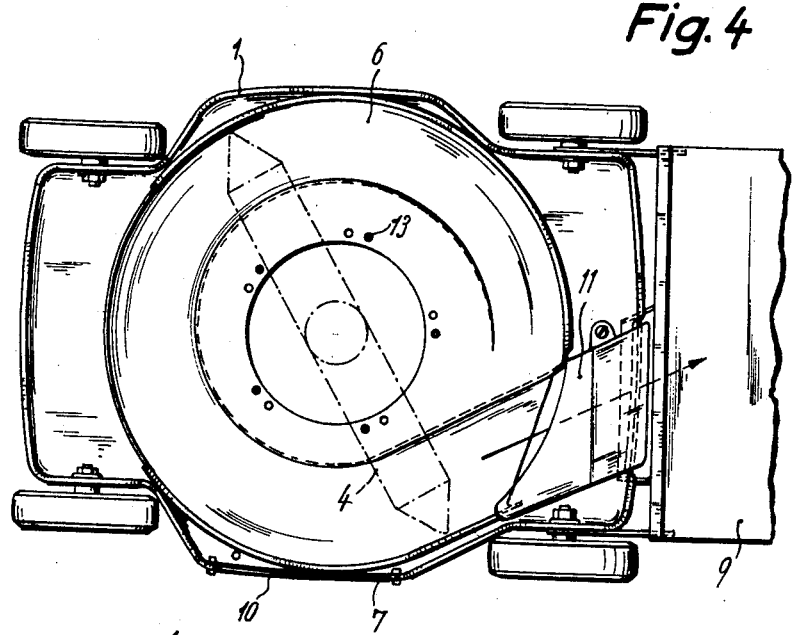
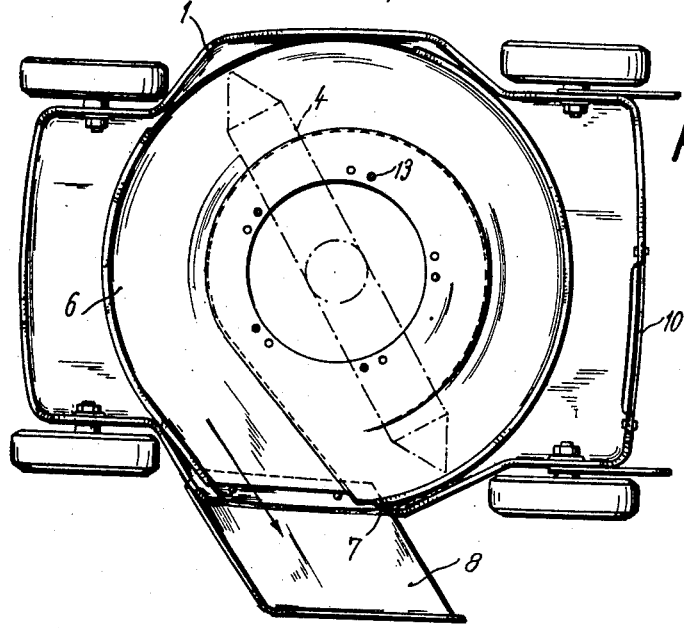

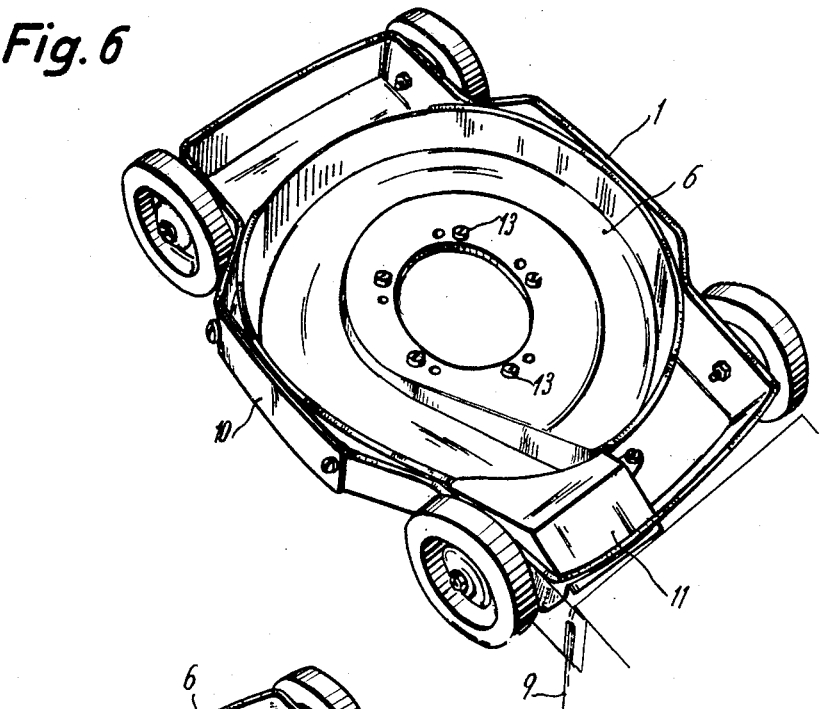
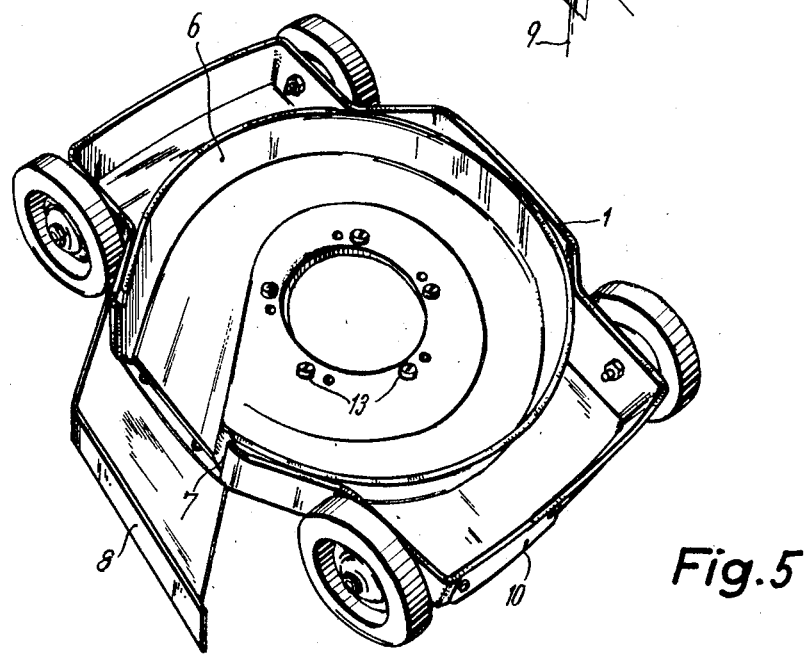

United States Patent Office 3,150,479
Patented Sept. 29, 1964

3,150,479
POWER LAWN MOWER
Dieter Josef Ewald Wolf, Betzdorf (Sieg), Germany, assignor to Wolf-Geräte G.m.b.H., Betzdorf (Sieg), Germany
Filed Nov. 30, 1962, Ser. No. 241,209
Claims priority, application Germany Dec. 4, 1961
1 Claim. (Cl. 56—25.4)

Power lawn mowers consist in most cases of power sickles, in which the motor is carried by the housing, on the underside of which a cutter beam rotates about a vertical axis. In various machines of this type the air stream produced by the rotating cutter beam has been utilized for discharging the grass clippings on one side or at the rear end face of the machine. In other known power lawn mowers, discharge openings are disposed both on the side as well as at the end, and can be selectively used, the respective other discharge opening being covered by a closing plate. The discharge opening disposed at the end of the machine may discharge into a grass collecting basket suspended from the machine. The lateral discharge opening may have a baffle plate associated with it, which causes the discharged grass clippings to be laid down beside the mower.

Further power mowers are known in which the machine housing has attached to it on the underside a separate structure which defines a passage, in which a strong air blast is produced to promote the discharge of the grass clippings. In the known machines, the outlet opening of the blast passage is disposed on one side or at one end of the machine so that the user has no choice between one direction of discharge or the other.

This disadvantage is eliminated by the invention in which the means defining the blast passage in the mower housing are designed to be inserted by the user selectively in two different positions, in one of which they effect a lateral discharge and in the other of which they effect an endwise discharge.

Figure 1:
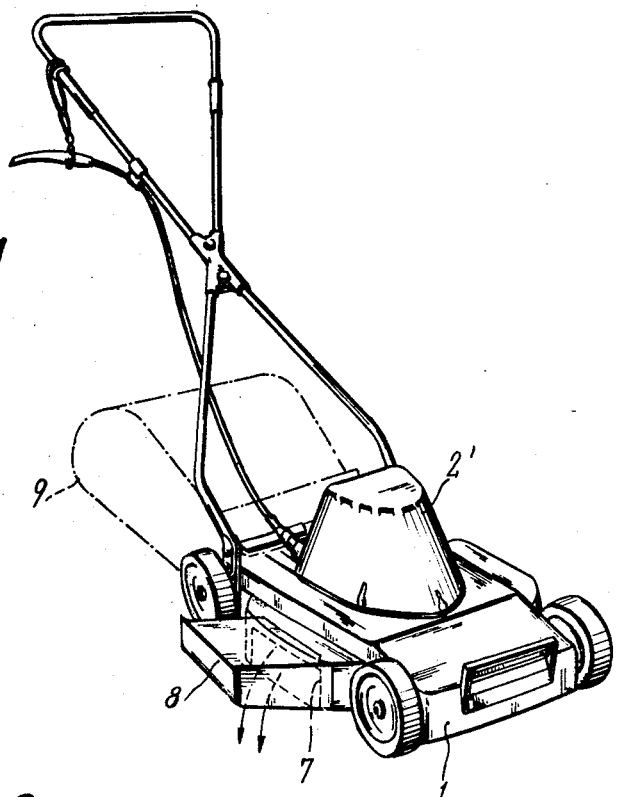
Figure 2:
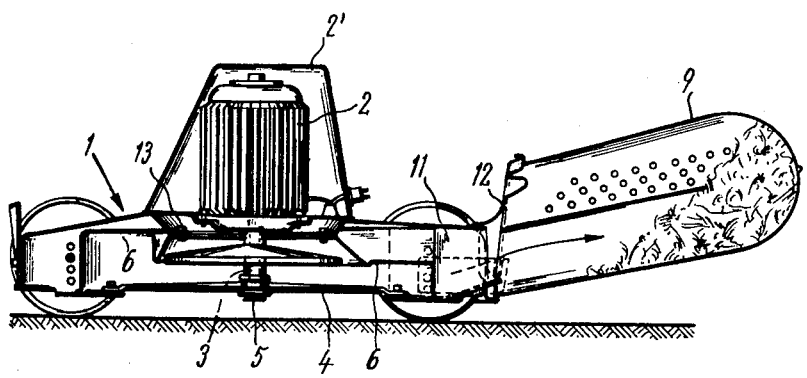

The invention will now be explained with reference to the accompanying drawings, in which FIG. 1 is an elevation showing a lawn mower of that type to which the invention is applicable, FIG. 2 is a longitudinal sectional view showing a lawn mower according to the invention and provided with a grass collecting basket, and FIGURES 3 and 4 are diagrammatic views showing a lawn mower as viewed from below and having a blast passage defining means which can be inserted according to the invention selectively in the position of FIG. 3, for a lateral discharge of grass, or in the position of FIG. 4, for an endwise discharge into the attached grass collecting basket.

FIGURES 5 and 6 are perspective views of the underside of the lawn mower and correspond to FIGS. 3 and 4 respectively.

The wheeled housing 1 of the power mower carries at the top the motor 2, which is shown as an electric motor and has a depending stub shaft 3, to which the cutter bar 4 is detachably connected by means indicated at 5. 2' is a readily detachable hood which prevents any contact with the motor 2 while it is in operation.

The housing 1 incorporates blast passage defining means 6, which is so designed according to the invention that it may be selectively inserted in the positions shown in FIGURES 3 and 5, on the one hand, or in FIGURES 4 and 6, on the other hand. In the position shown in FIGURES 3 and 5 the air stream produced by the rotating cutter bar is discharged from the blast passage at a lateral opening 7 of the housing 1 and then impinges on a baffle plate 8, which is screw-connected to the housing and deflects the discharged grass clippings downwardly toward the ground.

In the position shown in FIGURES 4 and 6, the air stream is discharged from the blast passage at the end of the housing 1. In this case a grass collecting basket 9 is attached to this end in known manner. That discharge opening of the housing which is not used may be closed by a closing plate 10.

In the position shown in FIGURES 4 and 6, a guide plate 11 provided in a manner known per se causes the emerging air blast to be directed into the grass collecting basket 9. To prevent dry clippings from being thrown out of the grass collecting basket, the same may have a cover plate 12 attached to it. The cover plate is suitably hooked into the grass collecting basket as shown in FIG. 2 so that the cover plate opens like a hinged flap when the grass collecting basket is to be emptied.

The blast passage defining means 6 consists of a downwardly open, pot-shaped housing member, which is designed to cause a strong air stream to be produced by the rotary motion of the cutter 4. The blast passage housing 6 is inserted into the housing 1 from below and secured with the aid of four or six fixing screws 13. As is indicated in FIGURES 3 and 4, the housing 1 is provided with holes which permit of inserting the blast passage defining means 6 in and securing them to the housing selectively in the position shown in FIGURES 3 and 5, on the one hand, and in FIGURES 4 and 6, on the other hand.

What is claimed is:

A power lawn mower which comprises a housing having a lateral opening and an endwise opening, a cutter disposed on the under side of said housing and mounted therein for rotation about a vertical axis, blast passage defining means detachably mounted in said housing and having an outlet opening, and locating and fixing means operatively associated with said housing and blast passage means at equally spaced points about said vertical axis for locating said blast passage defining means selectively in two different positions relative to said housing and detachably fixing said blast passage defining means to said housing, said locating and fixing means having one position in which said outlet opening registers with said lateral opening, said locating and fixing means having a second position in which said outlet opening registers with said endwise opening, said cutter being rotatable to detach clippings and produce in said blast passage defining means an air stream directed towards said outlet opening and entraining said clippings, said blast passage being a downwardly open pot-shaped housing member.

References Cited in the file of this patent
UNITED STATES PATENTS

| | | |
|---|---|---|
| 2,641,100 | Sylvester | June 9, 1953 |
| 2,663,984 | Clark | Dec. 29, 1953 |
| 2,756,556 | Watkins | July 31, 1956 |
| 2,807,126 | Bennett | Sept. 24, 1957 |
| 2,942,400 | Sylvester | June 28, 1960 |
| 2,955,402 | Strasel | Oct. 11, 1960 |